US011321185B2

(12) United States Patent
Srinivasan et al.

(10) Patent No.: US 11,321,185 B2
(45) Date of Patent: May 3, 2022

(54) METHOD TO DETECT AND EXCLUDE ORPHANED VIRTUAL MACHINES FROM BACKUP

(71) Applicant: EMC IP Holding Company LLC, Hopkinton, MA (US)

(72) Inventors: Sharath Talkad Srinivasan, Bengaluru (IN); Smitha Prakash Kalburgi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 16/399,402

(22) Filed: Apr. 30, 2019

(65) Prior Publication Data

US 2020/0349023 A1 Nov. 5, 2020

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,690,666 B1* | 6/2017 | Shembavnekar | G06F 11/1451 |
| 2007/0244938 A1* | 10/2007 | Michael | G06F 16/128 |
| 2008/0256533 A1* | 10/2008 | Ben-Yehuda | G06F 9/45558 718/1 |
| 2013/0346470 A1* | 12/2013 | Obstfeld | G06F 9/5044 709/202 |
| 2015/0142747 A1* | 5/2015 | Zou | G06F 11/1407 707/649 |
| 2016/0350099 A1* | 12/2016 | Suparna | G06F 11/368 |
| 2018/0129569 A1* | 5/2018 | Jathar | G06F 11/1451 |
| 2019/0138400 A1* | 5/2019 | Csatari | G06F 11/1464 |
| 2020/0092334 A1* | 3/2020 | Hiebert | G06F 11/1461 |

* cited by examiner

*Primary Examiner* — Meng Ai T An
*Assistant Examiner* — Zujia Xu
(74) *Attorney, Agent, or Firm* — Chamberlain, Hrdlicka, White, Williams & Aughtry

(57) ABSTRACT

A method for performing a backup operation includes receiving, by a backup storage device, a backup request, and in response to the backup request: identifying a plurality of virtual machines (VMs) associated with the backup request, identifying a VM of the plurality of VMs that is in an orphaned state; and, initiating a backup for each of the plurality of VMs except the VM.

9 Claims, 6 Drawing Sheets

METHOD TO DETECT AND EXCLUDE ORPHANED VIRTUAL MACHINES FROM BACKUP

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for performing backup operations in accordance with one or more embodiments of the invention The method includes receiving, by a backup storage device, a backup request, and in response to the backup request: identifying a plurality of virtual machines (VMs) associated with the backup request, identifying a VM of the plurality of VMs that is in an orphaned state; and, initiating a backup for each of the plurality of VMs except the VM.

In one aspect, a non-transitory computer readable medium in accordance with one or more embodiments of the invention includes computer readable program code, which when executed by a computer processor enables the computer processor to perform a method for performing backup operations. The method includes receiving, by a backup storage device, a backup request, and in response to the backup request: identifying a plurality of virtual machines (VMs) associated with the backup request, identifying a VM of the plurality of VMs that is in an orphaned state; and, initiating a backup for each of the plurality of VMs except the VM.

In one aspect, a system in accordance with one or more embodiments of the invention includes a processor and a management console programmed to perform a method for performing backup operations. The method includes receiving, by a backup storage device, a backup request, and in response to the backup request: identifying a plurality of virtual machines (VMs) associated with the backup request, identifying a VM of the plurality of VMs that is in an orphaned state; and, initiating a backup for each of the plurality of VMs except the VM.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup operation. Embodiments of the invention manage the backup operation by identifying virtual machines specified in a request to perform the backup operation that are not to be backed up due to the virtual machines being in an orphaned state. Embodiments of the invention include monitoring configuration information of virtual machines by a VM management application to determine a state of each the virtual machines. Virtual machines not being monitored due to, for example, a full or partial deletion of the virtual machines from a production host (without the VM management application being notified), may be placed in an orphaned state.

Embodiments of the invention include notifying, via the VM management application, a backup storage device of the state of the virtual machines. The backup storage device may, based on the orphaned state of the virtual machines, remove the virtual machines specified in the backup operation that are in an orphaned state so as to not attempt to perform a backup of virtual machines that have been deleted from the production host.

Figure 1A:
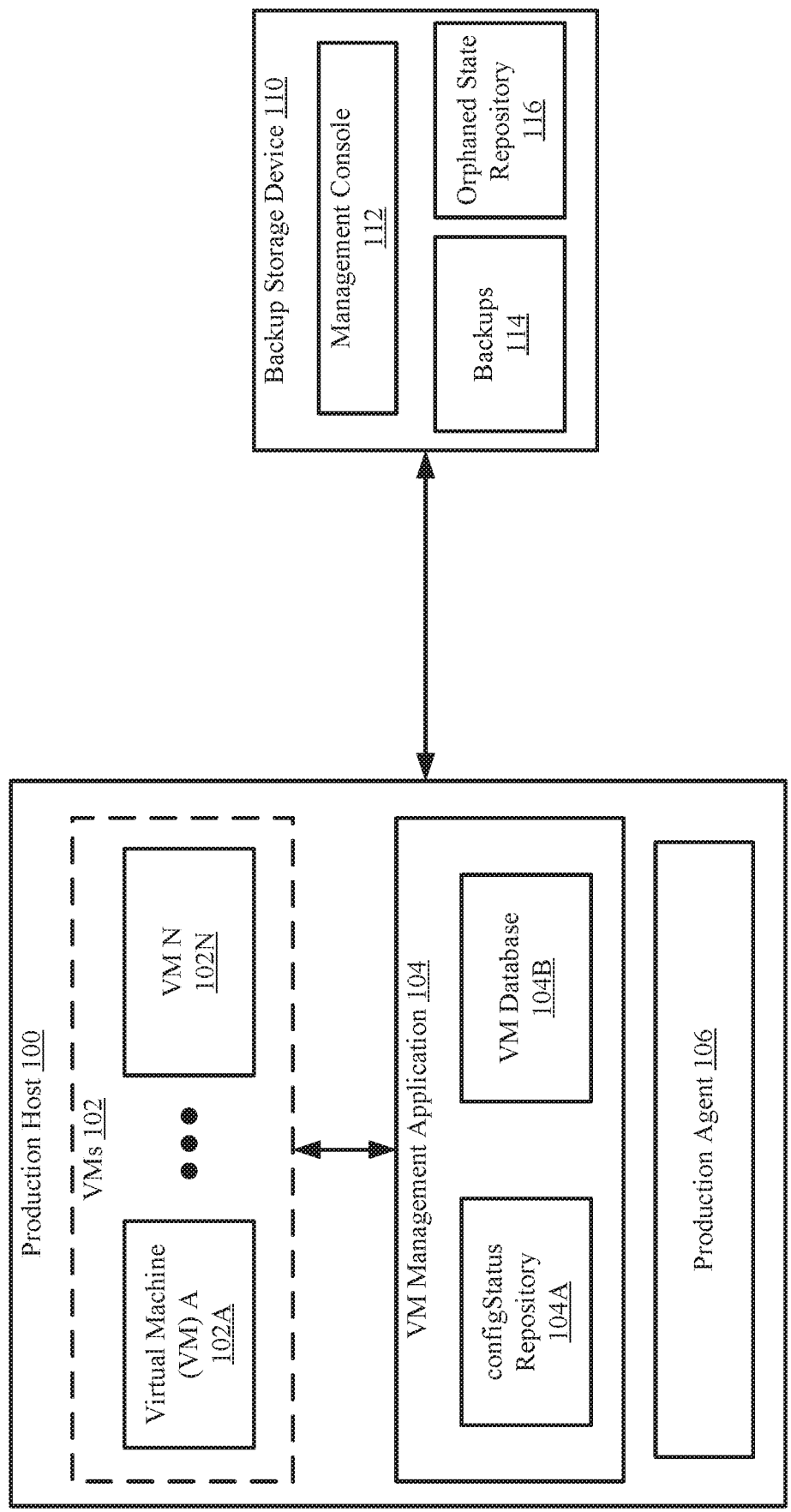
FIG. 1A shows a diagram of a system in accordance with one or more embodiments of the invention.

FIG. 1A shows an example system in accordance with one or more embodiments of the invention. The system includes one or more production hosts (100) and a backup storage device (110). The system may include additional, fewer, and/or different components without departing from the invention. Each component may be operably connected via any combination of wired and/or wireless connections. Each component illustrated in FIG. 1A is discussed below.

In one or more embodiments of the invention, the production host (100) hosts virtual machines (VMs) (102). The virtual machines (102) may be logical entities executed using computing resources (not shown) of the production host (100). Each of the virtual machines (102) may be performing similar or different processes. In one or more embodiments of the invention, the virtual machines (102) provide services to users, e.g., clients (not shown). For example, the virtual machines (102) may host instances of databases, email servers, and/or other applications. The virtual machines (102) may host other types of applications without departing from the invention. In one or more embodiments of the invention, the virtual machines (102) issue backup storage requests to store data in a backup storage device (110).

In one or more of embodiments of the invention, the virtual machines (102) are implemented as computer instructions, e.g., computer code, stored on a persistent storage (e.g., on the production host (100)) that when executed by a processor(s) of the production host (100) cause the production host (100) to provide the functionality of the virtual machines (102) described throughout this application.

In one or more embodiments of the invention, the VMs (102) are managed by a VM management application (104). The VM management application (104) includes functionality to manage the configuration status of each of the VMs (102A, 102N). The VM management application (104) may periodically monitor the VMs (102) to determine a configuration status (configStatus) of each VM. The configStatus may be stored in a configStatus repository (104A). Additionally, the VM management application (104) includes a VM database (104B) that specifies the VMs (102) managed by the VM management application.

Figure 2A:
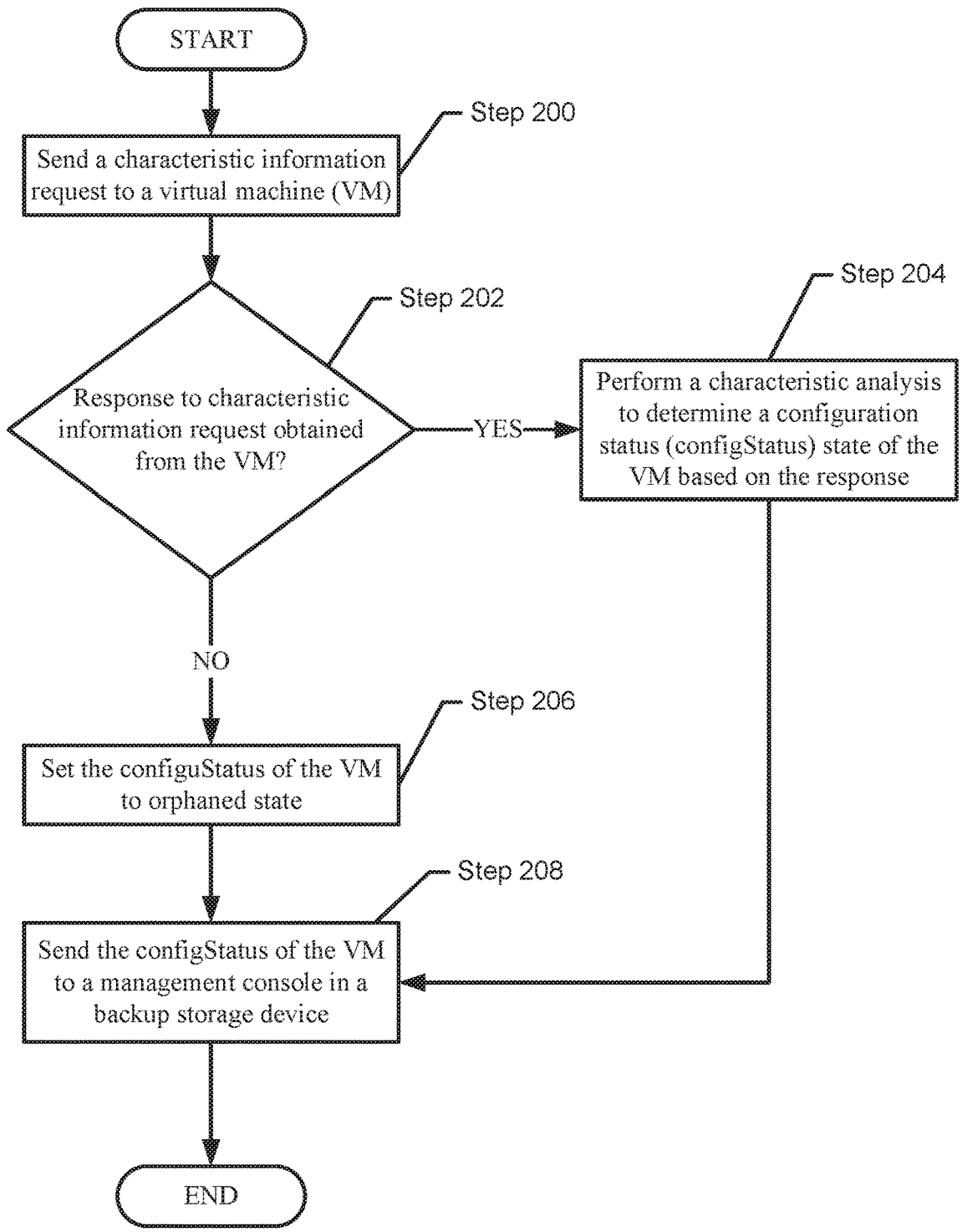
FIG. 2A shows a flowchart for managing virtual machines in accordance with one or more embodiments of the invention.

In one or more of embodiments of the invention, the VM management application (104) is implemented as computer instructions, e.g., computer code, stored on a persistent storage that when executed by a processor of the production host (100) cause the production host (100) to provide the functionality of the VM management application (104) described throughout the application and/or all, or a portion thereof, of the method illustrated in FIG. 2A.

In one or more embodiments of the invention, the configStatus repository (104A) is a data structure that stores a configuration status (configStatus) of each of the VMs (102). The configStatus repository (104A) may include entries that each specify a VM (102A, 102N) and a configStatus corresponding to the VM. The configStatus of a VM may be a state of the virtual machine that is identified by the VM management application (104). The VM management application (104) may identify a configStatus by monitoring characteristic information of the VM and performing a characteristic analysis on the VM. For additional details regarding the characteristic information and/or characteristic analysis, see, e.g., FIG. 2A.

In one or more embodiments of the invention, the VM database (104B) is a data structure that specifies the VMs (102) managed by the VM management application (104). The VM database (104B) may include additional information about the VMs (102) that is not included in the configStatus repository. The additional information may include, for example, network settings, operating systems on which the VMs are operating, metadata for contents of the data stored by the VMs, and/or other information without departing from the invention.

In one or more embodiments of the invention, one or more of the VMs (102) may be deleted. The VMs (e.g., 102A, 102N) may be deleted using a client (not shown) communicating directly with a production host (100) without the use of the VM management application (104). In such a scenario, the VM management application (104) may not be notified of the client deleting the VMs. Therefore, VM database (104B) may not be updated with the deleted VMs. In other words, the deleted VMs may be specified in the VM database (104B) as a VM managed by the VM management application (104) even though the VM no longer operates under the production host (100).

In a separate scenario, the client may communicate to the VM management application (104) a request to delete a VM (102A, 102N). The VM management application (104), using computing resources of the production host (100), may delete the requested VMs (102A, 102N). Subsequently, having knowledge of the deleted VMs, the VM management application (104) may update the VM database (104B) accordingly (i.e., by removing the deleted VMs from the VM database (104B)).

In one or more embodiments of the invention, the production host (100) includes a production agent (106) that aides in the generation of backups of one or more virtual machines (102A, 102N). The production agent (106) may obtain requests from the backup storage device (110) to generate backups of any of the virtual machines (102A, 102N). The production agent (106) may subsequently perform a backup operation to generate backups to be stored in the backup storage device (110). In one or more embodiments of the invention, a backup of a virtual machine is a collection of data that may be used to recover all or a portion of the virtual machine to a point in time. After the backups are generated by the production agent (106), the backups may be transmitted to the backup storage device (110) to be stored as backups (114).

In one or more of embodiments of the invention, the production agent (106) is implemented as computer instructions, e.g., computer code, stored on a persistent storage that when executed by a processor of the production host (100) causes the production host (100) to provide the functionality of the production agent (106) described throughout the application.

Figure 4:
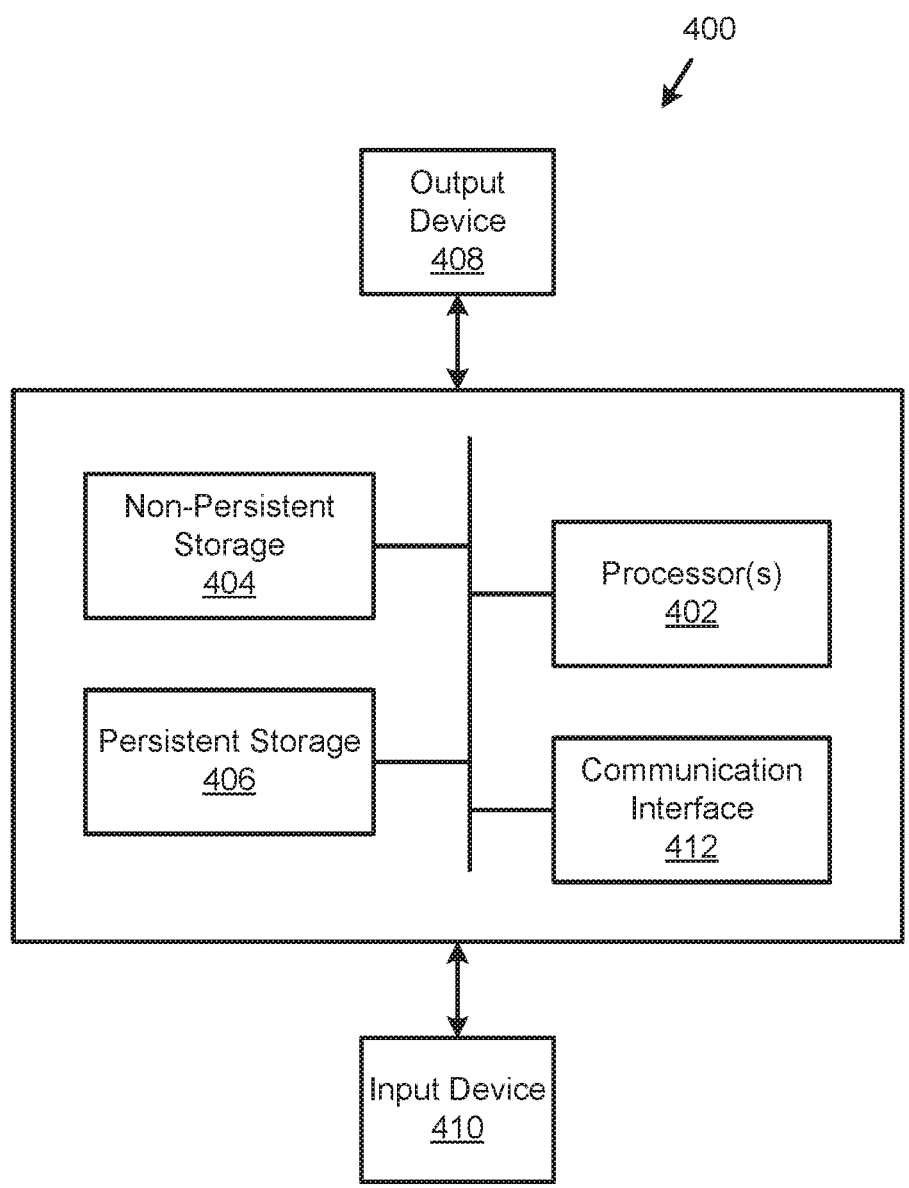
FIG. 4 shows a diagram of a computing device in accordance with one or more embodiments of the invention.

In one or more embodiments of the invention, the production host (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (100) described throughout this application and/or all, or a portion thereof, of the method illustrated in FIG. 2A.

In one or more embodiments of the invention, the production host (100) is implemented as a logical device. The logical device may utilize the computing resources of any number of computing devices and thereby provide the functionality of the production host (100) described throughout this application and/or all, or a portion thereof, of the method illustrated in FIG. 2A.

In one or more embodiments of the invention, the backup storage device (110) is a device that stores one or more backups (114) of VMs (102). The backup storage device (110) includes a management console (112) that services backup requests obtained from the production agent (106), or other entities, that specifies backups to be generated. The management console (112) may service the backup requests by identifying virtual machines to be backed up based on the backup requests and based on an orphaned state repository (116).

In one or more embodiments of the invention, the management console (112) initiates backup operations. A backup operation is a method for generating backups (e.g., 114) of the VMs (102). The management console (112) may initiate a backup operation after obtaining backup requests to backup one or more virtual machines. In one or more embodiments of the invention, the backup requests are obtained using backup policies implemented by the management console (112). The backup policies may be a data structure that specifies a schedule for when to back up each of the virtual machines (102A, 102N), a type of backup to generate, and/or other policies without departing from the invention.

In one or more embodiments of the invention, the management console (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the management console (112) described throughout this application and/or all, or a portion thereof, of the method illustrated in FIG. 2B.

Figure 2B:
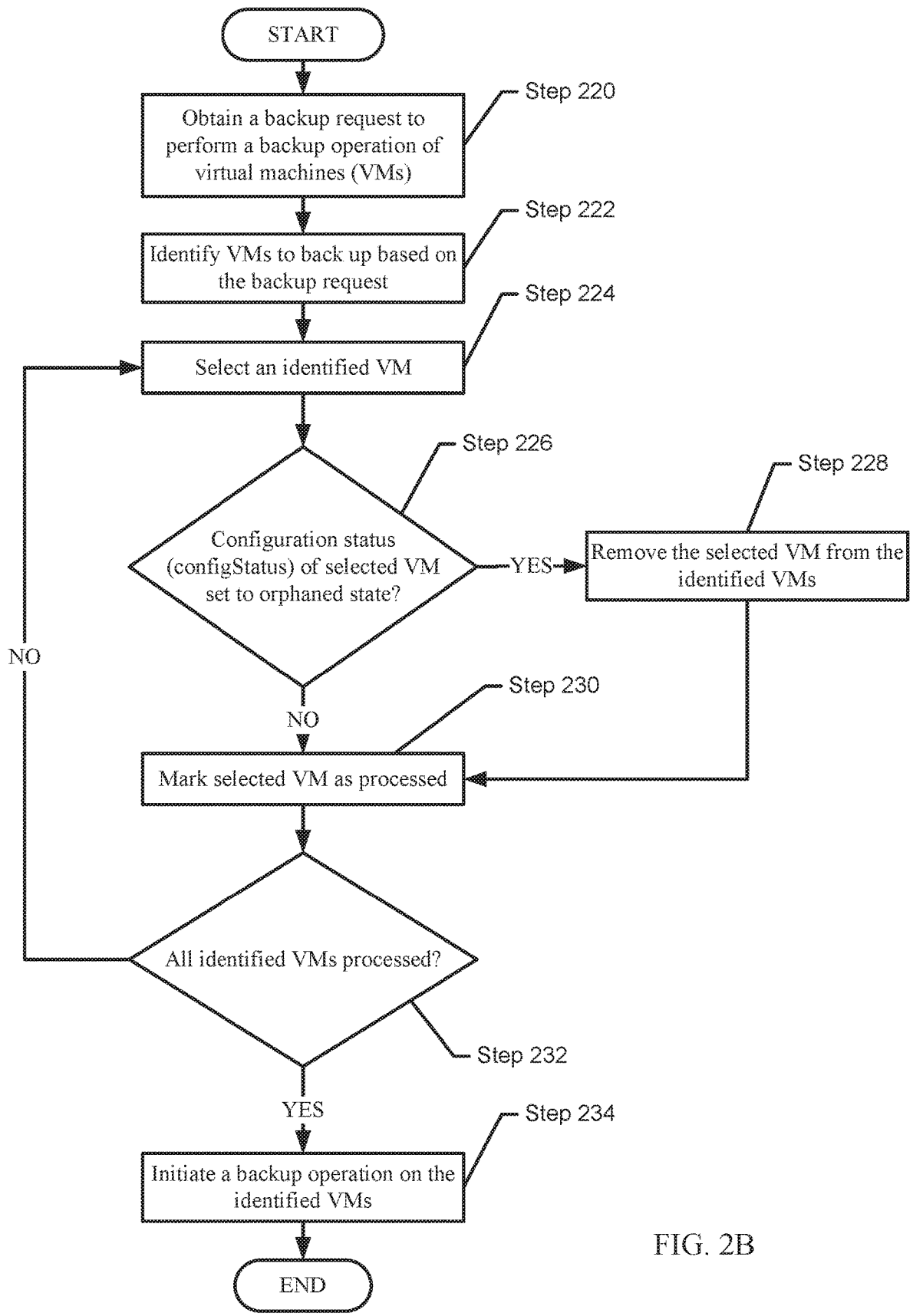
FIG. 2B shows a flowchart for managing backup operations in accordance with one or more embodiments of the invention.

In one or more embodiments of the invention, the management console (112) is implemented as computer instructions, e.g., computer code, stored on a persistent storage that when executed by a processor of the backup storage device (110) cause the backup storage device (110) to provide the functionality of the management console (112) described throughout the application and/or all, or a portion thereof, of the method illustrated in FIG. 2B.

In one or more embodiments of the invention, the orphaned state repository (116) is a data structure that specifies virtual machines that are in an orphaned state. The orphaned state repository (116) may be populated based on updates sent by the VM management application (104). The management console (112) may use the orphaned state repository (116) when servicing the backup requests.

In one or more embodiments of the invention, each of the backups (114), as discussed above, is a data structure that includes data used for the full or partial recovery of a virtual machine. The backups may include copies of data from one or more VMs (102A, 102N), copies of data from a portion of a VM, or of encoded copies of the data from the VMs. The backups (114) may be obtained by the production agent (106) when performing a recovery of a VM (102A, 102N).

Figure 1B:
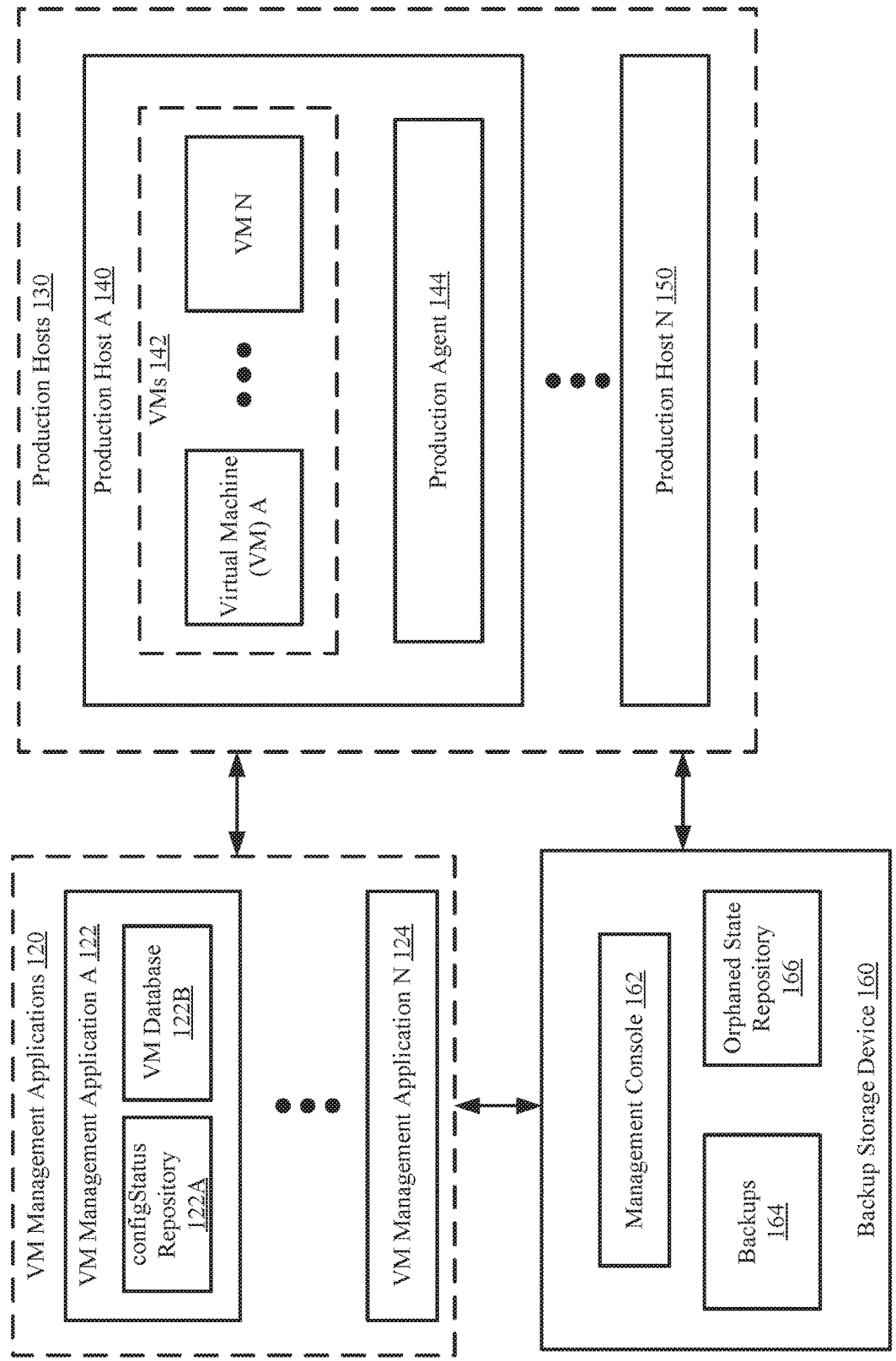
FIG. 1B shows a diagram of a system in accordance with one or more embodiments of the invention.

FIG. 1B shows a diagram of a system in accordance with one or more embodiments of the invention. The system includes one or more production hosts (130) and a backup storage device (160). The system may include additional, fewer, and/or different components without departing from the invention. Each component may be operably connected via any combination of wired and/or wireless connections. Each component illustrated in FIG. 1B is discussed below.

In one or more embodiments of the invention, the production hosts (140, 150) host virtual machines (VMs) (142). The virtual machines (142) may be logical entities executed using computing resources (not shown) of the production hosts (140, 150). Each of the virtual machines (142) may be performing similar or different processes. In one or more embodiments of the invention, the virtual machines (142) provide services to users, e.g., clients (not shown). For example, the virtual machines (142) may host instances of databases, email servers, and/or other applications. The virtual machines (142) may host other types of applications without departing from the invention. In one or more embodiments of the invention, the virtual machines (142) issue backup storage requests to store data in a backup storage device (160).

In one or more of embodiments of the invention, the virtual machines (142) are implemented as computer instructions, e.g., computer code, stored on a persistent storage (e.g., on the production host (140)) that when executed by a processor(s) of the production host (140) cause the production host (140) to provide the functionality of the virtual machines (142) described throughout this application.

In one or more embodiments of the invention, the VMs (142) of a production host (140, 150) are managed by one or more VM management applications (e.g., 122, 124). The VM management applications (120) may be devices that manage the configuration status of each of the VMs (142). The VM management application(s) (1122, 124) may periodically monitor the VMs (142) to determine a configuration status (configStatus) of each VM. The configStatus of each VM may be stored in a configStatus repository (122A). Additionally, the VM management application (122, 124) includes a VM database (122B) that specifies the VMs (142) managed by the VM management application.

In one or more embodiments of the invention, each VM management application (122, 124) manages the VMs of a production host (140, 150). In other words, there is a one-to-one relationship between a VM management application (122, 124) and a production host (140, 150). Conversely, each VM management application (122, 124) may manage VMs of multiple production hosts (130).

In one or more embodiments of the invention, the VM management applications (122, 124) are physical devices. The physical devices may include circuitry. The physical device may be, for example, a field-programmable gate array, application specific integrated circuit, programmable processor, microcontroller, digital signal processor, or other hardware processor. The physical device may be adapted to provide the functionality of the VM management application (122,124) described throughout this application and/or all, or a portion thereof, of the method illustrated in FIG. 2A.

In one or more of embodiments of the invention, the VM management applications (122, 124) is implemented as computer instructions, e.g., computer code, stored on a persistent storage that when executed by a processor of a computing device (see, e.g., FIG. 4) cause the computing device to provide the functionality of the VM management application (122, 124) described throughout the application and/or all, or a portion thereof, of the method illustrated in FIG. 2A.

In one or more embodiments of the invention, the configStatus repository (122A) is a data structure that stores a configuration status (config Status) of each of the VMs (142). The configStatus repository (122A) may include entries that each specify a VM (102A, 102N) and a configStatus corresponding to the VM. The configStatus of a VM may be a state of the virtual machine that is identified by the VM management application (122). The VM management application (122) may identify a configStatus by monitoring characteristic information of the VM and performing a characteristic analysis on the VM. For additional details regarding the characteristic information and/or characteristic analysis, see, e.g., FIG. 2A.

In one or more embodiments of the invention, the VM database (122B) is a data structure that specifies the VMs (142) managed by a VM management application (122, 124). The VM database (122B) may include additional information about the VMs (142) that is not included in the configStatus repository (122A). The additional information may include, for example, network settings, operating systems on which the VMs are operating, metadata for contents of the data stored by the VMs, and/or other information without departing from the invention.

In one or more embodiments of the invention, one or more of the VMs (142) may be deleted. The VMs may be deleted using a client (not shown) communicating directly with a production host (140, 150) without the use of a VM management application (122, 124) managing the deleted VMs. In such a scenario, the VM management application (122, 124) may not be notified of the client deleting the VMs. Therefore, VM database (122B) may not be updated in response to VMs being deleted. In other words, the deleted VMs may be specified in the VM database (122B) as VMs managed by the VM management application (122, 124) even though the VMs no longer operate under the production host (140, 150).

In a separate scenario, the client may communicate to the VM management application (122, 124) a request to delete a VM. The VM management application (122, 124) may subsequently send a request for deletion to the production host (140, 150) on which the requested VM is operating. By having knowledge of the deleted VMs, the VM management application (122, 124) may update the VM database (122B) accordingly (i.e., by removing the deleted VMs from the VM database (122B)).

In one or more embodiments of the invention, the production hosts (130) each include a production agent (144) that aides in the generation of backups of one or more of the virtual machines (142). The production agent (144) may obtain requests from the backup storage device (160) to generate backups of any of the virtual machines (142). The production agent (144) may subsequently perform a backup operation to generate backups to be stored in the backup storage device (160). In one or more embodiments of the invention, a backup of a virtual machine is a collection of data that may be used to recover all or a portion of the virtual machine to a point in time. After the backups are generated by the production agent (144), the backups may be transmitted to the backup storage device (160) to be stored as backups (164).

In one or more embodiments of the invention, the production agent (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (144) described throughout this application.

In one or more of embodiments of the invention, the production agent (144) is implemented as computer instructions, e.g., computer code, stored on a persistent storage that when executed by a processor of a production host (140, 150) cause the production host (130, 140) to provide the functionality of the production agent (144) described throughout the application.

In one or more embodiments of the invention, each of the production hosts (140, 150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (140, 150) described throughout this application and/or all, or a portion thereof, of the method illustrated in FIG. 2A.

In one or more embodiments of the invention, each of the production host (140, 150) is implemented as a logical device. The logical device may utilize the computing resources of any number of computing devices and thereby provide the functionality of the production host (140, 150) described throughout this application and/or all, or a portion thereof, of the method illustrated in FIG. 2A.

In one or more embodiments of the invention, the backup storage device (160) is a device that stores one or more backups (164) of VMs (142). The backup storage device (160) includes a management console (162) that services backup requests obtained from the production agent (144), or other entities, that specifies backups to be generated. The management console (162) may service the backup requests by identifying virtual machines to be backed up based on the backup requests and based on an orphaned state repository (166).

In one or more embodiments of the invention, the management console (162) initiates backup operations. A backup operation is a method for generating backups (e.g., 164) of the VMs (142). The management console (162) may initiate a backup operation after obtaining backup requests to backup one or more virtual machines. In one or more embodiments of the invention, the backup requests are obtained using backup policies implemented by the management console (162). The backup policies may be a data structure that specifies a schedule for when to back up each of the virtual machines (142), a type of backup to generate, and/or other policies without departing from the invention.

In one or more embodiments of the invention, the management console (162) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the management console (162) described throughout this application and/or all, or a portion thereof, of the method illustrated in FIG. 2B.

In one or more of embodiments of the invention, the management console (162) is implemented as computer instructions, e.g., computer code, stored on a persistent storage that when executed by a processor of the backup storage device (160) cause the backup storage device (160) to provide the functionality of the management console (162) described throughout the application and/or all, or a portion thereof, of the method illustrated in FIG. 2B.

In one or more embodiments of the invention, the orphaned state repository (166) is a data structure that specifies virtual machines that are in an orphaned state. The orphaned state repository (166) may be populated based on updates sent by the VM management application (122, 124). The management console (162) may use the orphaned state repository (166) when servicing the backup requests.

In one or more embodiments of the invention, each of the backups (164), as discussed above, is a data structure that includes data used for the full or partial recovery of a virtual machine. The backups may include copies of data from one or more VMs, copies of data from a portion of a VM, or of encoded copies of the data from the VMs. The backups (164) may be sent to the production agent (144) when performing a recovery of a VM.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for managing virtual machines in accordance with one or more embodiments of the invention. The method shown in FIG. 2A may be performed by, for example, a VM management application (e.g., 104, FIG. 1A; 122, 124, FIG. 1B). Other components of the system illustrated in FIG. 1A and/or FIG. 1B may perform the method of FIG. 2A without departing from the invention. The method of FIG. 2A may be repeated by the management application, or another component, for each virtual machine managed by the VM management application. The method may be performed periodically (e.g., every 24 hours), after a request from a client (not shown), or based on any other policy without departing from the invention.

Turning to FIG. 2A, in step 200, a characteristic information request is sent to a virtual machine. The characteristic information request may request responses by a VM to queries about a state of the VM. The queries may request to identify configurations of the VM, such as, for example, an IP or MAC address, a production host in which the VM is operating, network configurations, access to computing devices of a production host, and/or other configuration queries without departing from the invention. The VM management application may wait a predetermined time to obtain a response to the characteristic information request.

In step 202, a determination is made about whether a response to the characteristic information request is obtained from the VM. If a response to the characteristic information request is obtained, the method proceeds to step 204; otherwise, the method proceeds to step 206.

In one or more embodiments of the invention, a network connection is lost between the VM and the VM management application. In such a scenario, the VM management application may obtain a response that specifies the lost network connection. Subsequently, the method proceeds to step 206.

In one or more embodiments of the invention, the VM not responding to the characteristic information request is due to the VM being fully or partially deleted, removed from the production host, and/or otherwise unavailable. In such a scenario, the method proceeds to step 204.

In step 204, a characteristic analysis is performed to determine a configStatus state of the VM based on the response. In one more embodiments of the invention, the response obtained specifies configuration information about the VM. The configuration information may be used by the VM management application to determine a state of the configStatus.

In one or more embodiments of the invention, the VM management console sets the configStatus of the VM to a problem state if the configuration information indicates that there is an issue with the configuration of the VM. Examples of configuration information indicating a problem with the configuration may include the VM losing connection to the VM management application, the VM lacking available computing resources (e.g., storage or processing) to perform requested tasks, and/or other problems with the VM without departing from the invention.

In one or more embodiments of the invention, the VM management console sets the configStaus of the VM to a potential-problem state if the configuration information indicates that a problem with the VM may arise unless the problem is addressed. Examples of configuration information indicating a problem with the VM may arise may include low storage availability of the VM, a reconfiguration, or lack of, fail-over policies. A fail-over policy may be a set of conditions that address situations in which the VM experiences a problem.

In one or more embodiments of the invention, the VM management console sets the configStatus of the VM to a problem-free state if the configuration information indicates that there are no problems with the configurations of VM.

In step 206, the configStatus state of the VM is set to orphaned state. In one or more embodiments of the invention, the configStatus state of the VM is set to orphaned state due to the VM not responding to the characteristic information request. In one or more embodiments of the invention, the orphaned state is a state of the configStatus of a VM that implies the VM has been removed from the production host, fully or partially deleted, and/or otherwise unavailable for future use. Consequently, the configuration of the VM is not monitored.

In step 208, the configStatus of the VM is sent to a management console of a backup storage device. In one or more embodiments of the invention, the VM management application informs the management console of the backup storage device of the configStatus of the VM through a notification that specifies the VM and the configStatus.

In one or more embodiments of the invention, the management console performs actions based on the obtained configStatus of the VM. If the configStatus specifies a problem state or a potential-problem state, the management console may update backup policies associated with the VM. For example, the management console may modify backup policies for a VM that is in a potential-problem state by increasing the frequency in which the VM is backed up. In this manner, if the VM in the potential-problem state is to become unavailable in the near future, the most up-to-date data associated with the VM is likely to be stored in the backup storage device.

In one or more embodiments of the invention, the configStatus specifying an orphaned state of the VM is stored in an orphaned state repository of the backup storage device. The orphaned state repository may be used by the management console to perform backup operations of VMs.

FIG. 2B shows a flowchart for managing backup operations in accordance with one or more embodiments of the invention. The method shown in FIG. 2B may be performed by, for example, a management console (e.g., 112, FIG. 1A; 162, FIG. 1B). Other components of the system illustrated in FIG. 1A and/or FIG. 1B may perform the method of FIG. 2B without departing from the invention.

In step 220, a backup request to perform a backup operation of VMs is obtained. In one or more embodiments of the invention, the backup request is obtained from a production agent. The production agent may obtain a client request from a client, a VM, or another entity to perform a backup operation on any of the VMs executing on the production host. The production agent may service the request by sending a backup request to the management console to identify backup policies associated with the VMs specified in the backup request.

In one or more embodiments of the invention, the backup request is obtained based on backup policies implemented by the management console. The backup policies may specify a backup of any of the VMs to be performed based on a schedule, based on an event (e.g., before a software update of a VM), and/or any other metric without departing from the invention.

In step 222, VMs to back up based on the backup request are identified. In one or more embodiments of the invention, the identified VMs are specified in the backup request.

In step 224, an identified VM is selected.

In step 226, a determination is made about whether a configStatus of the selected VM is set to an orphaned state. If the configStatus of the selected VM is set to an orphaned state, the method proceeds to step 228; otherwise, the method proceeds to step 230. In one or more embodiments of the invention, the management console queries the orphaned state repository to determine whether the selected VM is specified. The configStatus of the selected VM is set to an orphaned state if the selected VM is specified in the orphaned state repository; otherwise, the configStatus of the selected VM is not set to orphaned state.

In step 228, the selected VM is removed for the identified VMs. In this manner, the selected VM is not backed up due to the selected VM being in an orphaned state. Step 228 prevents the management console from attempting to back up a VM that has been deleted.

In step 230, the selected VM is marked as processed.

In step 232, a determination is made about whether all identified VMs are processed. If all identified VMs are processed, the method proceeds to step 234; otherwise, the method proceeds to step 224.

In step 234, a backup operation is initiated on the identified VMs. In one or more embodiments of the invention, a list of the identified VMs is sent to a production agent of the production host with the specified backup policies for each identified VM. The management console may request that the production agent generate the backup as specified by the backup policies.

Example

Figure 3:
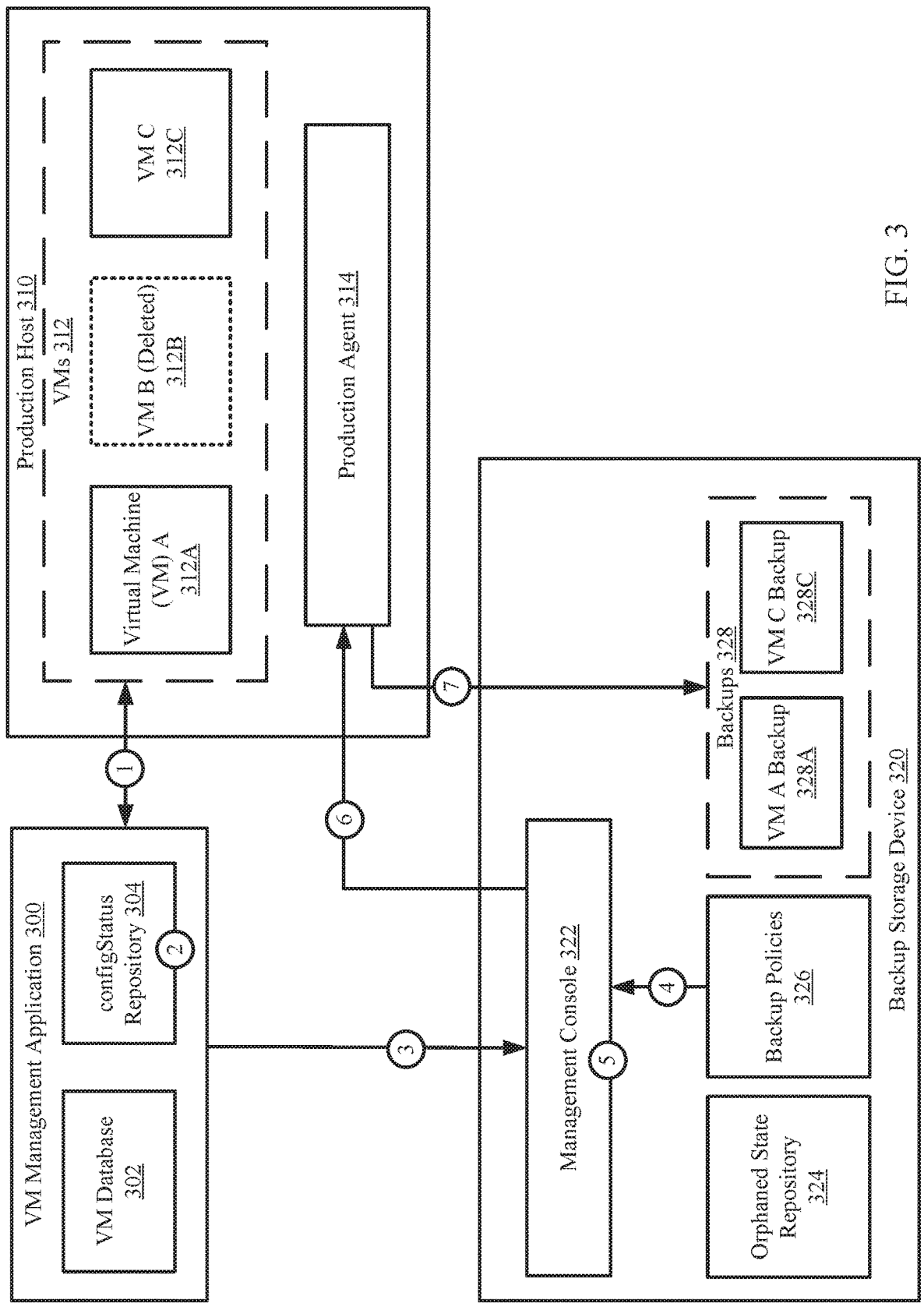
FIG. 3 shows an example in accordance with one or more embodiments of the invention.

The following section describes an example. The example, illustrated in FIG. 3, is not intended to limit the invention. Turning to the example, consider a scenario in which a backup request has been obtained by a management console (322) implementing backup policies.

Prior to obtaining the backup request, a VM management application (300) managing VMs A (312A), B (312B), and C (312C) monitors the VMs (312A, 312B, 312C) to determine a configStatus of each VM [1].). The VM management application (300) may request a status of the available storage utilized by each VM (312A, 312B, 312C) but only obtain a response only from VM A (312A) and VM C (312C) that there is available storage for both VMs. No response was received from VM B (312B) because it was deleted by the production host (310) in response to a request by a client (not shown. Continuing with the example, based on responses from the VMs, the VM management application (300) may place VM A (312A) and VM C (312C) in a problem-free state and may place VM B (312B) in an orphaned state [2]. The VM management application (300) forwards information about the orphaned state of VM B (312B) to the management console [3]. The management console stores information that VM B (312) is in an orphaned state in the orphaned state repository (324).

At a later point in time, the backup request is obtained by the management console (322) based on a backup policy that specifies backing up virtual machines A, B, and C (312A, 312B, 312C) [4]. The management console (322) may search through the orphaned state repository (324) to identify any virtual machines that are in an orphaned state [5]. The management console (322) identifies VM B (312B) in an orphaned state, and, therefore, removes VM B (312B) from the VMs specified by the backup request. The management console (322) sends an updated backup request, specifying backing up VMs A and C (312A, 312C), to the production agent (314) of the production host (310) [6]. The production agent generates a backup of the requested VMs A and C (312A, 312C) and stores the backups (328) in the backup storage device (320) [7].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve a method for backing up multiple virtual machines by identifying virtual machines that cannot be backed up. The virtual machines may not be able to be backed up due to being partially or fully deleted, or otherwise unavailable. Embodiments of the invention monitor characteristics of the virtual machines to identify a configuration status of each virtual machine managed by a virtual management application. Virtual machines that may not be backed up may be placed in an orphaned state.

Embodiments of the invention forward the configuration status of virtual machines placed in an orphaned status to a backup storage device managing the backups of the virtual machines. The backup storage device, implementing backup policies, may be requested to back up a virtual machine that has been placed in an orphaned state. By having updated configuration statuses of the virtual machines, the backup storage device avoids wasting computing resources by not attempting to back up virtual machines that cannot be backed up.

Thus, embodiments of the invention may address the problem of inefficient use of computing resources. This problem arises due to the technological nature of the environment in which backup policies and backup systems are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations for virtual machines (VMs) hosted by a plurality of production hosts, each of the plurality of production hosts having a production agent, wherein the plurality of production hosts are coupled to a backup storage device and a computing device having a VM management application, the method comprising:
   receiving, by the backup storage device, a backup request from the production agent executing on one of the plurality of production hosts; and
   in response to the backup request:
      identifying, by a management console within the backup storage backup device, one or more virtual machines (VMs), among a plurality of VMs, hosted by the one of the plurality of production hosts associated with the backup request;
      sending, by the VM management application, a characteristic information request to each of the plurality of VMs to obtain characteristic information comprising: a configuration of each of the plurality of VMs, an internet protocol (IP) or media access control (MAC) address of each of the plurality of VMs, an identity of the one of the plurality of production hosts hosting each of the plurality of VMs, network configurations of each of the plurality of VMs, and host accessibility information with respect to the one of the plurality of the production hosts hosting each of the plurality of VMs;
      making a first determination that a first VM of the plurality of VMs did not respond to the characteristic information request;
      based on the first determination, setting, by the VM management application, only the first VM among the plurality of VMs to an orphaned state, wherein the orphaned state indicates that the first VM is fully or partially deleted or unavailable for future use;
      making a second determination that the characteristic information received from a second VM of the plurality of VMs specifies that a problem will eventually occur with the second VM unless the second VM is configured to address the problem;
      based on the second determination, setting, by the VM management application, the second VM to a potential-problem state;
      sending, by the VM management application, configuration status for the first VM and the second VM to the management console, wherein the configuration status indicating the first VM is in the orphaned state and the second VM is in the potential-problem state;
      in response to receiving the configuration status, the management console performs:
         storing, the configuration status for the first VM in an orphaned state repository within the backup storage device;
         modifying backup policies of the second VM to increase a frequency at which the second VM is to be backed up; and
         initiating a backup for all of the plurality of VMs not set to the orphaned state without ever backing up the first VM set to the orphaned state based on the orphaned state repository and the modified backup policies.

2. The method of claim 1, further comprising:
   prior to receiving the backup request:
      receiving the configuration status for the first VM from the VM management application.

3. The method of claim 1, further comprising:
   prior to receiving the backup request:
      receiving configuration statuses for each of the plurality of VMs from the VM management application, wherein the first VM and the second VM are ones of the configuration statuses.

4. A non-transitory computer readable medium comprising computer readable program code, which when executed by a computer processor enables the computer processor to perform a method for performing a backup operation for virtual machines (VMs) hosted by a plurality of production hosts, each of the plurality of production hosts having a production agent, wherein the plurality of production hosts are coupled to a backup storage device and a computing device having a VM management application, the method comprising:
   receiving, by the backup storage device, a backup request from the production agent executing on one of the plurality of production hosts; and
   in response to the backup request;
      identifying, by a management console within the backup storage backup device, one or more virtual machines (VMs), among a plurality of VMs, hosted by the one of the plurality of production hosts associated with the backup request;
      sending, by the VM management application, a characteristic information request to each of the plurality of VMs to obtain characteristic information comprising: a configuration of each of the plurality of VMs, an internet protocol (IP) or media access control (MAC) address of each of the plurality of VMs, an identity of the one of the plurality of production hosts hosting each of the plurality of VMs, network configurations of each of the plurality of VMs, and host accessibility information with respect to the one of the plurality of the production hosts hosting each of the plurality of VMs;

making a first determination that a first VM of the plurality of VMs did not respond to the characteristic information request;

based on the first determination, setting, by the VM management application, only the first VM among the plurality of VMs to an orphaned state, wherein the orphaned state indicates that the first VM is fully or partially deleted or unavailable for future use;

making a second determination that the characteristics information received from a second VM of the plurality of VMs specifies that there a problem will eventually occur with the second VM unless the second VM is configured to address the problem;

based on the second determination, setting, by the VM management application, the second VM to a potential-problem state;

sending, by the VM management application, configuration status for the first VM and the second VM to the management console, wherein the configuration status indicating the first VM is in the orphaned state and the second VM is in the potential-problem state;

in response to receiving the configuration status, the management console performs:

storing, the configuration status for the first VM in an orphaned state repository within the backup storage device;

modifying backup policies of the second VM to increase a frequency at which the second VM is to be backed up; and initiating a backup for all of the plurality of VMs not set to the orphaned state without ever backing up the first VM set to the orphaned state based on the orphaned state repository and the modified backup policies.

5. The non-transitory computer readable medium of claim 4, further comprising:

prior to receiving the backup request:
receiving the configuration status for the first VM from the VM management application.

6. The non-transitory computer readable medium of claim 4, further comprising:

prior to receiving the backup request:
receiving configuration statuses for each of the plurality of VMs from the VM management application, wherein the first VM and the second VM are ones of the configuration statuses.

7. A system for performing backup operations for virtual machines (VMs) hosted by a plurality of production hosts, each of the plurality of production hosts having a production agent, wherein the plurality of production hosts are coupled to a backup storage device and a computing device having a VM management application, wherein the system is the backup storage device, the system comprising:

a processor;
a management console programmed to:
receive a backup request from the production agent executing on one of the plurality of production hosts; and in response to the backup request:
identify, by the management console, one or more virtual machines (VMs), among a plurality of VMs, hosted by the one of the plurality of production hosts associated with the backup request;

send, by the VM management application, a characteristic information request to each of the plurality of VMs to obtain characteristic information comprising a configuration of each of the plurality of VMs, an internet protocol (IP) or media access control (MAC) address of each of the plurality of VMs, an identity of the one of the plurality of production hosts hosting each of the plurality of VMs, network configurations of each of the plurality of VMs, and host accessibility information with respect to the one of the plurality of the production hosts hosting each of the plurality of VMs;

make a first determination that a first VM of the plurality of VMs did not respond to the characteristic information request;

based on the first determination, set, by the VM management application, only the first VM among the plurality of VMs to an orphaned state, wherein the orphaned state indicates that the first VM is fully or partially deleted or unavailable for future use;

make a second determination that the characteristics information received from a second VM of the plurality of VMs specifies that a problem will eventually occur with the second VM unless the second VM is configured to address the problem;

based on the second determination, set, by the VM management application, the second VM to a potential-problem state;

send, by the VM management application, configuration status for the first VM and the second VM to the management console, wherein the configuration status indicating the first VM is in the orphaned state and the second VM is in the potential-problem state;

in response to receiving the configuration status, the management console performs:

storing, the configuration status for the first VM in an orphaned state repository within the backup storage device;

modifying backup policies of the second VM to increase a frequency at which the second VM is to be backed up; and initiating a backup for all of the plurality of VMs not set to the orphaned state without ever backing up the first VM set to the orphaned state based on the orphaned state repository and the modified backup policies.

8. The system of claim 7, further comprising:
prior to receiving the backup request:
receiving the configuration status for the first VM from the VM management application.

9. The system of claim 7, further comprising:
prior to receiving the backup request:
receiving configuration statuses for each of the plurality of VMs from the VM management application, wherein the first VM and the second VM are ones of the configuration statuses.

* * * * *